Dec. 17, 1957     A. C. PHILLIPS     2,816,967
ELECTRICAL CONTACTORS

Filed March 8, 1954     2 Sheets-Sheet 1

Inventor
A. C. PHILLIPS
By
Attorneys

Dec. 17, 1957  A. C. PHILLIPS  2,816,967
ELECTRICAL CONTACTORS
Filed March 8, 1954  2 Sheets-Sheet 2

United States Patent Office 2,816,967
Patented Dec. 17, 1957

2,816,967
ELECTRICAL CONTACTORS

Arthur Claud Phillips, Hillington, Glasgow, Scotland, assignor to Kelvin & Hughes Limited, Glasgow, Scotland Application March 8, 1954, Serial No. 414,775

Claims priority, application Great Britain March 13, 1953

1 Claim. (Cl. 200—27)

This invention relates to high speed electrical contactors or current interrupter switch devices suitable for operation at speeds of some thousands of operations per minute. The device may be used for providing discontinuous current from a D. C. supply.

According to the invention, at least one flexible contact blade is mounted at one part and has one end adjacent a contact and an eccentrically mounted ball or roller bearing, rotation of which effects contact of the blade with the contact.

In the case where two blades are used mounted ends of the blades may be located at one side of a support with the blades extending approximately parallel to each other towards the opposite side of the support where resilient contact arms are independently mounted and extend towards said blades and having backing blades for frictional damping of the arms. The outer race of said bearing may contact said blades at positions nearer to their free ends than their mounted ends and said bearing may be disposed on a spindle between eccentric flanges that provide dynamic balancing of the bearing.

A constructional form of the invention will now be described by way of example with reference to the accompanying diagrammatic drawings wherein.

Figure 1:
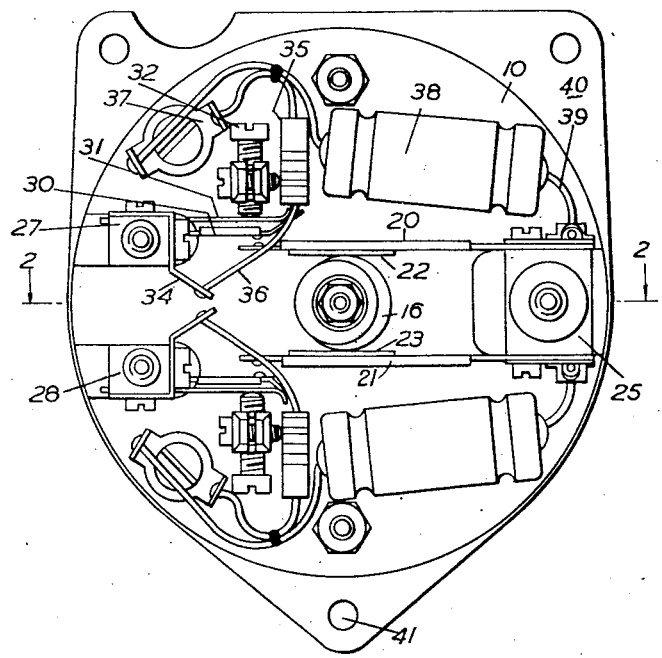
Figure 1 is a plan view of a device made in accordance with the invention.
Figure 2:
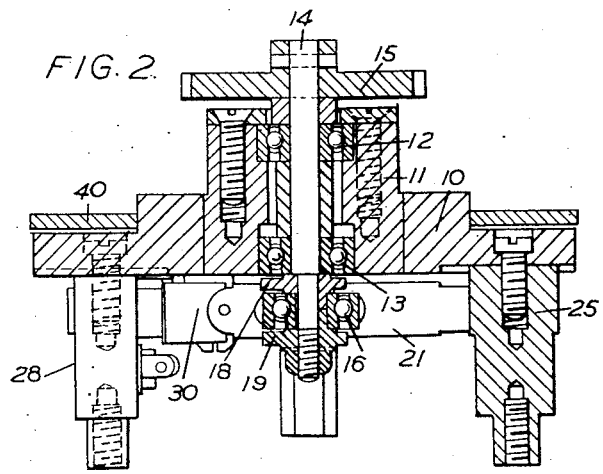
Figure 2 is a sectional view thereof on the line 2—2 on Figure 1.
Figure 3:
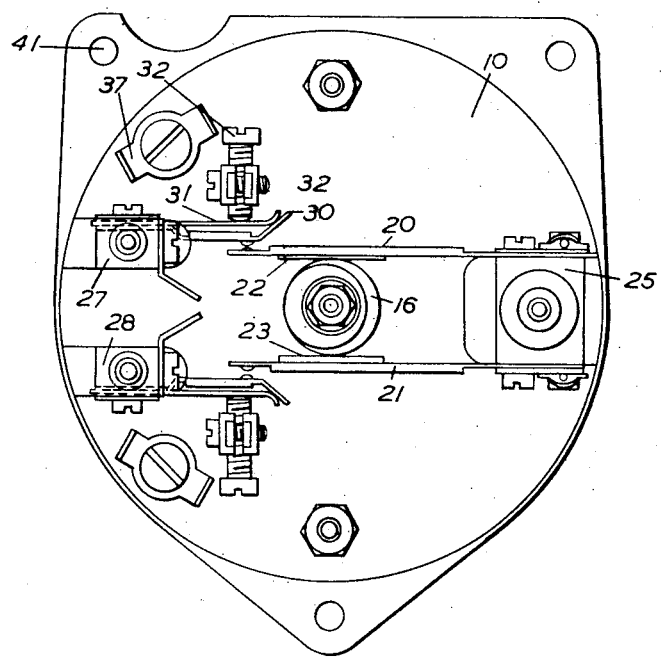
Figure 3 is a view similar to Figure 1 but with certain parts removed.

A base plate 10 made of insulating material has a central hole in which a separate central bearing boss 11 is fixed which projects on the outer side of the plate. Mounted within this boss by a pair of spaced ball bearings 12, 13 therein is a spindle 14 that projects beyond said boss at both ends and carries a gear wheel 15 at its outer end whereby it is rotated and carries a third ball bearing 16 at its inner end. This third bearing is disposed between a pair of eccentric flanges 18, 19 mounted on the shaft and these flanges have eccentric sleeves extending towards each other and carrying the inner race of the bearing 16 which is thereby held eccentrically in relation to its shaft 14. The outer race of the bearing 16 rotates freely between a pair of contact blades 20, 21 and bears on bearing strips 22, 23 carried by these blades. These blades are parallel to each other and of equal length and adjacent ends are clamped against opposite sides of a pillar 25 that is mounted on the base plate 10 at one side of the device. This pillar also serves as one pole of the device. At the other side of the device the base plate carries two other pillars 27, 28 spaced apart. Each of these pillars carries a set of identical elements, and one set will be described.

Each set comprises a contact arm 30 extending towards the respective blade parallel thereto on the outer side of the blades. The arm has a contact projection co-operating with the blade and at its free end the arm is inclined outwardly away from the blade where it is engaged by the free end of a backing blade 31 for frictional damping of the arm. This free end is bent outwards of the blade in the same general direction as the end of the arm, the outwardly bent part of the backing blade having sliding engagement with the outwardly inclined part of the arm 30. The other end of the damping blade is fixed to the same pillar (27, 28) as the arm but is spaced from the arm between its ends. An adjustable screw 32 engages the damping blade. A connecting tag 34 carried by the pillar is connected electrically by a wire 36 with a resistance element 35. This element is connected to one end of a conductor plate 37 carried by the base 10, and the other end of this plate is connected to a condenser 38 which is connected to the mounted end of the respective blade 30 by a wire 39. The resistance 35 and condenser 38 are designed for spark suppression.

The eccentric bearing 16 retains grease and operates as a substantially frictionless cam to ensure long life with a high degree of accuracy. The eccentric flanges 18, 19 serve for dynamic balancing of the bearing for which purpose their parts of greater radius are eccentric to the shaft but in the opposite sense to the eccentricity of the bearing.

The dynamically balanced eccentric ball race in combination with friction damping of the fixed contact arm and independent spark suppression means provides accuracy and long life at high speeds even up to 20,000 per minute.

A plate 40 on one side of the base 10 has apertures 41 for attachment of a casing (not shown).

As an example of connecting the device in an electric circuit, we may connect the pillar 25 to one pole of an electric battery, the other pole of which is connected to one end of each of two energising coils of relay devices, the other ends of which are connected one to the pillar 27 and the other to the pillar 28.

I claim:

An electrical current interrupter device comprising a first flexible blade, an actuating member eccentrically mounted for rotation adjacent said first blade for applying actuating forces to said first blade, a support member, a second flexible blade mounted as a cantilever on said support member and having its free end extending adjacent said first blade, a contact member on one of said first and second blades adjacent the free end of said second blade, and a backing blade mounted as a cantilever on said support member and having its free end in frictional contact with the free end of said second blade, said actuating member comprising an eccentrically mounted ball bearing having its outer race adjacent said first blade wherein the said ball bearing member is disposed on a spindle between eccentric flanges to provide dynamic balancing of said bearing member, said flanges having eccentric sleeves located between said spindle and said bearing member and extending toward each other to carry the inner race of said bearing and to hold it eccentrically whereby accuracy and long life at high speeds may be achieved.

References Cited in the file of this patent
UNITED STATES PATENTS

| | | |
|---|---|---|
| 1,254,477 | Carpenter | Jan. 22, 1918 |
| 1,480,546 | Cummiskey | Jan. 15, 1924 |
| 1,512,933 | Husta | Oct. 28, 1924 |
| 1,686,686 | Edison | Oct. 9, 1928 |
| 2,005,227 | Johnson | June 18, 1935 |
| 2,013,513 | Dressel | Sept. 3, 1935 |
| 2,055,880 | Pilla | Sept. 29, 1936 |
| 2,178,083 | Sandin | Oct. 31, 1939 |
| 2,606,259 | Huetten | Aug. 5, 1952 |